Feb. 28, 1967 H. L. JAGER 3,306,265
CATTLE INSECTICIDE APPLICATOR
Filed Oct. 19, 1965 2 Sheets-Sheet 1

INVENTOR.
HARRY L. JAGER
BY
Lothrop & West
ATTORNEYS

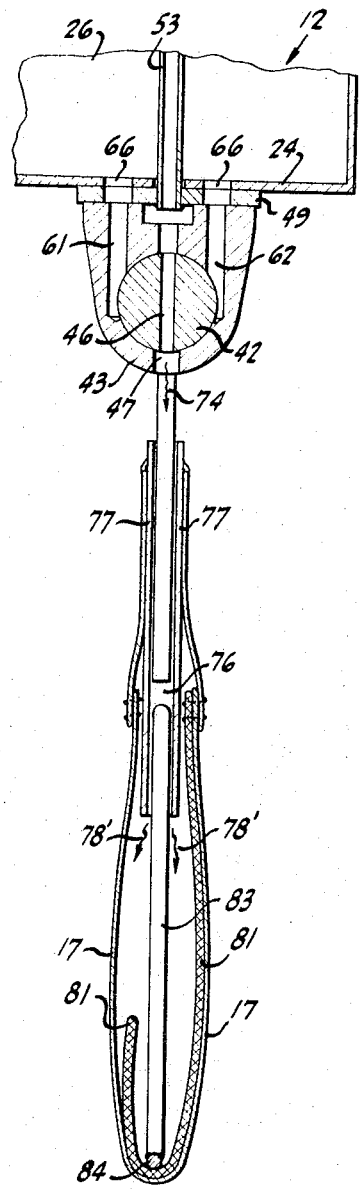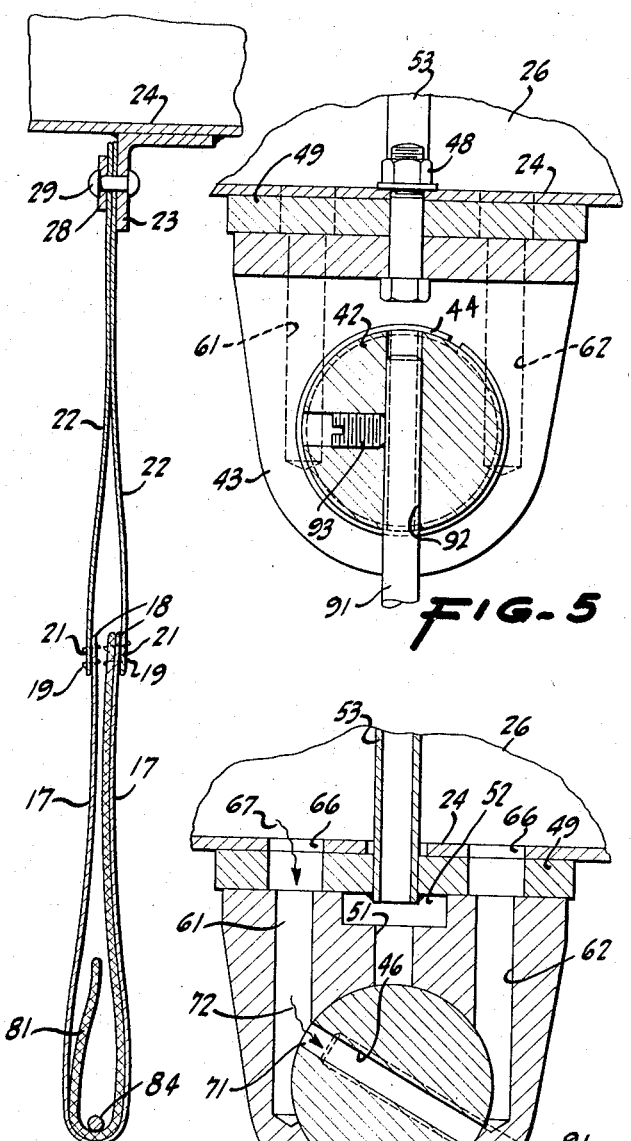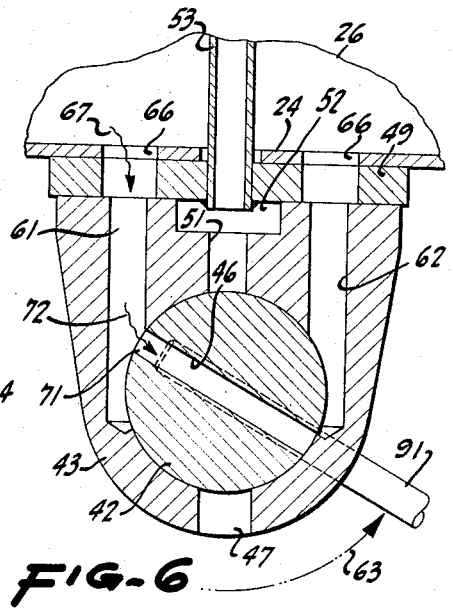

United States Patent Office 3,306,265
Patented Feb. 28, 1967

3,306,265
CATTLE INSECTICIDE APPLICATOR
Harry L. Jager, P.O. Box 41, Esparto, Calif. 95627
Filed Oct. 19, 1965, Ser. No. 497,832
3 Claims. (Cl. 119—157)

The invention relates to devices for applying liquid insecticide to the backs and sides of cattle for the control of cattle grubs and other undesirable insects to which cattle are subject.

It is an object of the invention to provide a cattle insecticide applicator which readily can be installed in a narrow fenced passageway of the type through which cattle are driven in moving the cattle from one location to another.

It is another object of the invention to provide an applicator which is economical, yet rugged and durable, and which requires no attention or upkeep except for the periodic addition of insecticide to the fluid reservoir.

It is a further object of the invention to provide a cattle insecticide applicator in which the insecticide is discharged from the reservoir only when the applicator is actually being put to use.

It is still a further object of the invention to provide an applicator which is relatively light in weight, compact and highly portable.

It is a yet further object of the invention to provide an applicator which is reliable and efficient in operation in that a large area of the hide is treated as cattle pass through the passageway and come into wiping engagement with the applicator.

It is another object of the invention to provide a generally improved cattle insecticide applicator.

Other objects, together with the foregoing, are attained in the embodiment described in the following description and shown in the accompanying drawings in which:

FIGURE 3 is a fragmentary, sectional view to an enlarged scale, the plane of the section being indicated by the line 3—3 in FIGURE 1;

FIGURE 4 is a sectional view comparable to that of FIGURE 3, but with the plane of the section being on the line 4—4 in FIGURE 1;

Figure 2:
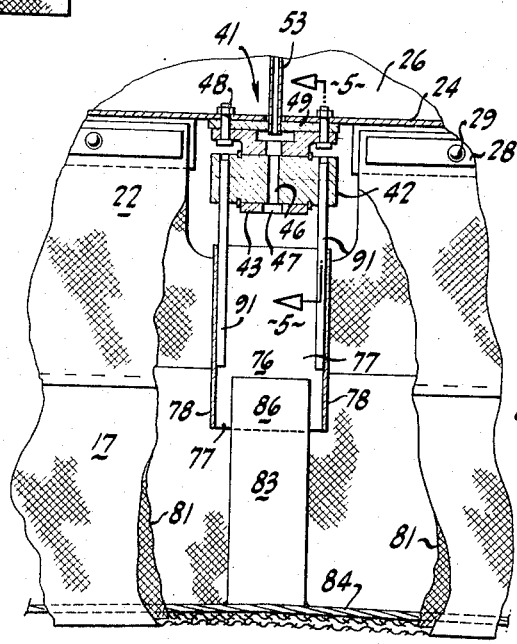
FIGURE 2 is a fragmentary view, to an enlarged scale of the valve and adjacent fabric applicator structure, portions being shown in section and other portions being broken away to disclose interior details.

FIGURE 5 is a fragmentary, sectional view to a greatly enlarged scale of the dispensing valve and attendant structure, the plane of the section being indicated by the line 5—5 in FIGURE 2; and, FIGURE 6 is a fragmentary, sectional view, to a greatly enlarged scale, of the valve and attendant structure, the plane of the section being transverse to the axis of rotation of the valve and extending vertically through the diametrical passageway of the valve.

While the cattle insecticide applicator of the invention is susceptible of numerous physical embodiments, depending upon the environment and requirements of use, substantial numbers of the herein shown and described embodiment have been made, tested and used, and all have performed in an eminently satisfactory manner.

The device of the invention, generally designated by the reference numeral 12, is preferably disposed adjacent the upper portion of a narrow, fenced walkway or passageway through which cattle move in single file. The device is supported from a cross-beam 13 by a pair of chains 14 attached to the beam 13 by suitable fasteners 15.

The chains are long enough so that the bottom edge 16 of the fabric applicator 17 will interfere with and engage in wiping engagement with the backs of cattle walking through the narrow passageway, the applicator being oriented transversely with respect to the path.

The applicator 17, or wiper, is preferably fabricated from a tough, wear-resistant, yet porous material, such as "nylon" netting.

As appears most clearly in FIGURE 4, the wiper 17 is formed into a narrow, U-shaped configuration, the upper ends 18 of the wiper panels being appropirately secured, as by stitching 19 to the bottom ends 21 of a pair of flaps 22 made of canvas or other durable yet flexible material.

The flaps 22, in turn, are supported by an angle iron 23 mounted on the bottom 24 of an elongated liquid container 26, or box, or reservoir for the liquid insecticide. The canvas flaps 22 being substantially coextensive in length with the reservoir 26 and the angle iron 23, are sturdily mounted on the angle iron by an elongated metal strap 28 extending along the angle iron and affixed thereto by a plurality of rivets 29.

The supply of fluid is introduced into the reservoir through a spout 31 covered by a vented, screw-on type of cap 32. The top of the reservoir is provided with a pair of inverted U-bolts 33 to which are fastened the lengths of chain 14.

In the interests of conserving the fluid insecticide, means are afforded for dispensing the fluid only during the period when cattle are walking through the passageway and are coming into wiping engagement with the applicator cloth 17. Furthermore, structure is provided for dispensing only a measured charge of fluid at each occurrence.

Inclusive of such means is a valve 41, located centrally below and mounted on the reservoir 26.

The valve 41 comprises a right, circular cylindrical valve member 42 rotatably mounted, in rather close tolerance, within a valve housing 43. A pair of snap rings 44 serves to prevent translational movement of the valve 42 and thus serves to maintain a central, diametrical passageway 46 extending through the cylinder in a central location with respect to a discharge bore 47, or orifice, in the bottom center of the housing.

The valve housing 43, mounted on the bottom 24 of the reservoir 26 by a pair of bolts 48, with an interposed backing plate 49, also includes a vertical air vent bore 51 and a connecting chamber 52 in axial registry with the lower discharge orifice 47. The bore 51 and the chamber 52 communicate with the atmosphere at all times by reason of a vent tube 53 extending vertically through the backing plate 49 and upwardly through the reservoir to terminate above the top 54 of the reservoir. A loosely fitting dust cap 56 covers the projecting upper end of the vent tube 53, allowing free venting but minimizing the entry of dust, rain, etc.

The passageway 46 of the rotary valve 42 intermittently communicates with one or the other of a pair of vertical recesses 61 and 62 or channels, formed in the housing as the valve swings through an arc, as indicated by the arrow 63.

The channels 61 and 62 remain filled with fluid at substantially all times by reason of their communication with the reservoir, the fluid flowing downwardly from the reservoir, through registering openings 66 in the bottom 24 and the backing plate 49, as indicated by the arrow 67, thence into the channels 61 and 62. As stated above, the filler cap 32 is vented thus allowing free flow of the fluid into the channels so as to keep them filled.

When the valve 42 rotates through the arc 63, the fluid in the channel 61 flows into the valve passageway 46 through an inlet port 71, in the manner indicated by the arrow 72, and fills the passageway 61 with a measured charge of fluid determined by the dimensions of the passageway 46. It will be noted that if the arc 63 were to be greater in extent than that shown in FIGURE 6, the channel 62 would also feed fluid into the valve passageway 46, but that in either circumstance, only a measured charge is stored in the valve passageway.

Then, as the valve returns to its normal, central, angular position with the valve passageway 46 in vertical attitude (see FIGURE 3), the measured quantity of fluid contained within the passageway 46 flows downwardly, by gravity, through the discharge orifice 47, and is thereby emptied. Free flow is possible since in vertical attitude of the passageway 46, the top of the fluid column is in free communication with the venting conduits 51, 52 and 53 leading to the atmosphere.

As the measured quantity of fluid discharges downwardly through the orifice 47, in the direction indicated by the arrow 74, it flows through a conduit 76 defined by a spaced pair of metal sheets 77 with end closure walls 78, the fluid discharging from the bottom of the conduit 76 in the divided manner indicated by the arrows 78' in FIGURE 3.

The fluid stream thereupon falls into engagement with an elongated wick 81 and, by capillary attraction, is distributed over the full extent of the wick. Since the wick is in face to face engagement, in the main, with the applicator netting 17, the fluid is dispersed over the netting, particularly on the lower portions thereof, for ready transference to the cattle coming into wiping engagement therewith.

Contact between the cattle and the wiper, or applicator, netting 17, as the cattle move along through the walkway, is reflected in angular movement of the netting and the canvas 22. In turn, this angular movement is transmitted to the rotary valve member 42 by reason of a vertical plate 83 secured at the bottom to a wire cable extending along the bottom fold of the wick 81 and the applicator 17, the plate 83 projecting upwardly into the conduit 76 formed by the sheet metal members 77 and 78.

In other words, as the cattle come into contact with the lower portion of the applicator, the plate 83 is swung forwardly. The upper portion 86 of the plate 83 (see FIGURE 2) thereupon engages with the nearby sheet metal walls of the conduit 76 and swings the conduit forwardly. This movement, in turn, is transmitted to the rotary valve 42 owing to a pair of rods 91 mounted on the conduit 76 and extending upwardly into holes 92 bored in the valve and secured therein by set-screws 93.

Figure 1:
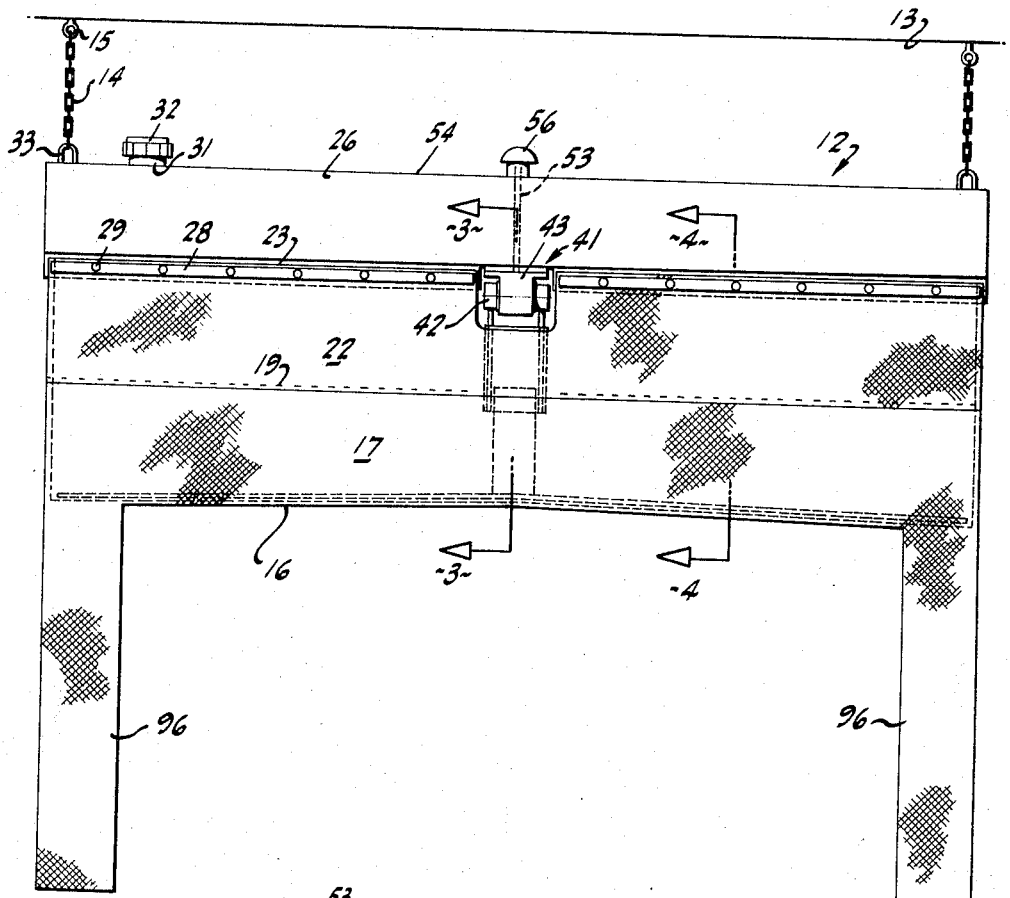
FIGURE 1 is a front elevational view of the device mounted on a cross beam above and transverse to the path of cattle.

To conform the bottom edge 16 of the applicator to the configuration of the backs of cattle, it is preferred that the contour be of the flat, inverted-V outline shown most clearly in FIGURE 1. Further to enhance the coverage, it is also desirable to provide on each end of the device a pair of depending strips 96, or pigtails, of applicator material which, in time, also become quite saturated with insecticide. The strips 96 are spaced apart a distance such that they wipe the sides of the cattle as they are concurrently being treated on their backs with a dosage of the insecticide.

As will be appreciated, the weight of the cable 84 and the plate 83, together with the other components is such that the applicator will not be swung into fluid discharging position by any but the more violent types of gusts of wind. It is also to be noted that the plunger and piston freedom of vertical movement afforded by the cable 84 and the plate 83 moving in the conduit 76 provides a resiliency and avoidance of harmful impacts from cattle whose conduct is often unpredictable and who might choose the moment of contact with the applicator to rise up suddenly and push against the superimposed structure. The chain mounting enhances this capability.

It can therefore be seen that I have provided a cattle insecticide device which is not only very effective in providing a thorough application of liquid insecticide, but also performs this function in a highly efficient and substantially automatic manner.

What is claimed is:
1. A cattle insecticide applicator comprising:
 (a) a horizontal, elongated box-like reservoir for the storage of liquid insecticide;
 (b) a valve housing mounted on the bottom of said reservoir;
 (c) a circular cylindrical valve rotatably mounted on said housing for rotation about a horizontal axis, said valve having a diametrical passageway formed therein including an inlet port and an outlet port, said housing having a vertical recess connecting with the bottom of said reservoir for the movement of fluid from said reservoir into said recess, said inlet port communicating with said housing recess in a first angular position of said valve and being removed therefrom in a second angular position of said valve, said housing also having formed therein a drainage bore, said drainage bore being removed from said outlet port in said first angular position as fluid flows from said housing recess through said inlet port and into said passageway, said drainage bore being in communication with said outlet port in said second angular position, said drainage bore being vertically below said outlet port in said second angular position to drain the fluid stored in said passageway by gravity;
 (d) means for venting said inlet port and said passageway to the atmosphere in said second angular position of said valve;
 (e) a horizontally elongated wick disposed in a generally vertical attitude below said drainage bore to receive by gravity the effluent discharge therefrom;
 (f) a horizontally elongated canvas-like strap pivotally supported on the bottom of said reservoir box and affixed to the upper edge of said wick to provide flexible support thereto;
 (g) a fabric applicator mounted on the bottom of said strap and enclosing said wick in face to face engagement therewith to receive the fluid distributed by said wick, the fabric of said applicator being of porous material to transfer the fluid received from said wick to the backs of cattle coming into wiping engagement with said fabric; and
 (h) means connecting said fabric applicator and said valve for moving said valve between said first angular position and said second angular position in dependence upon the lateral swinging movement of said fabric applicator.

2. The device of claim 1 wherein the bottom edge of said applicator material is formed to the shape of an inverted, shallow V.

3. The device of claim 2 further characterized by a pair of depending strips mounted on the ends of said fabric applicator, said strips being of the same material as said fabric applicator to conduct fluid downwardly by capillary attraction, said strips being spaced apart a distance less than the width of cattle for wiping engagement with the sides of cattle passing between said strips.

References Cited by the Examiner
UNITED STATES PATENTS

| | | | |
|---|---|---|---|
| 1,784,255 | 12/1930 | Slaten | 222—363 |
| 2,133,898 | 10/1938 | Mansfield | 119—157 |
| 3,144,004 | 8/1964 | Ness | 119—157 |
| 3,229,668 | 1/1966 | Koinzan | 119—157 |

SAMUEL KOREN, *Primary Examiner.*

HUGH R. CHAMBLEE, *Examiner.*